Patented June 29, 1943

2,322,809

UNITED STATES PATENT OFFICE 2,322,809

CYCLOPENTANO - POLYHYDROPHENAN - THRENE COMPOUNDS AND A METHOD OF MAKING THE SAME

Willy Logemann, Berlin-Charlottenburg, Hans Herloff Inhoffen, Berlin-Wilmersdorf, and Hans Eysenbach, Berlin-Conradshohe, Germany, assignors to Schering Corporation, Bloomfield, N. J., a corporation of New Jersey No Drawing. Application December 22, 1938, Serial No. 247,298. In Germany December 22, 1937

16 Claims. (Cl. 260—397.3)

This invention relates to cyclopentano-polyhydrophenanthrene compounds and a method of making the same.

According to specifications of United States patent applications Ser. No. 153,002, of W. Logemann, filed July 10, 1937; Ser. No. 229,878, of W. Logemann, filed September 14, 1938; Ser. No. 114,334, of Butenandt and Logemann, filed December 5, 1936; and German application Sch. 113,991, IVc/12o, polyhydroxy compounds of the cyclopentano-polyhydrophenanthrene series can be produced which in the ring system and in the side chain contain more than two hydroxyl groups or two hydroxyl groups and oxygen atoms, which are attached directly to carbon atoms of the carbon skeleton of the cyclopentano-polyhydrophenanthrene compounds.

See also Berichte der deutschen chemischen Gesellschaft 71, pp. 1362–66.

In accordance with the present invention compounds of particular physiological value are obtained when the primary or secondary hydroxyl groups present in the molecule of keto hydroxy or polyhydroxy compounds of the cyclopentano-polyhydrophenanthrene series are oxidised or dehydrogenated to oxo groups individually or collectively. There are obtained in this manner compounds with, for example, the effect of the hormone of the suprarenal cortex.

As starting materials can be employed all compounds of the cyclopentano-polyhydrophenanthrene series which contain a side chain with at least two hydroxyl groups or at least one hydroxyl group and a further oxygen atom and are further substituted in the ring system by at least one hydroxyl group or oxygen, that is to say for example polyhydroxy and keto-hydroxy compounds of the etiocholane, pregnane, estrane, hydroestrane series and their stereo-isomers, homologues and the like.

Particularly valuable compounds are produced from such compounds in which the side chain is on the carbon atom 17. The ring system itself can be saturated or unsaturated, and in the latter case it is to be recommended to protect the double bonds present intermediately from attack by the oxidising agent, for example, by attachment of halogen, halogen hydride and other known means. The double bonds can finally be reinstated, for example, by the action of agents splitting off halogen or halogen hydride.

As oxidising agents are suitable all compounds which are capable of dehydrogenating primary or secondary hydroxyl groups. There may be mentioned for example: chromic acid, bichromates in acid solution, alkali or alkaline earth permanganates, peroxides such as lead peroxide, metals such as platinum black or metal oxides as, for example, copper oxide, if desired under reduced pressure, in the presence of inert gases and/or in combination with hydrogen acceptors, metal alcoholates, in particular aluminium alcoholates, such as aluminum propylates or butylates in the presence of carbonyl compounds such as cyclohexanone or acetone, according to the process of exchanging oxidation stages known from the work of Meerwein and coworkers. In this case protection of the ring double bond by halogens or halogen hydride is not necessary.

The oxidation of the hydroxyl groups present in the molecule of the cyclopentano-polyhydrophenanthrene compounds can be carried out partially. In this case with the application of calculated quantities of the oxidising agent at first the primary hydroxyl groups present are oxidised. If on the other hand these primary hydroxyl groups or other oxidisable groups are intended to remain, they must be converted by transformation into such groups as can again be converted into the hydroxyl groups, for example, by hydrolysis. This can be carried out, for example, by partial esterification, halogenation and the like or better by partial etherification, for example, by reaction with triaryl-methyl-halides which with corresponding methods of working react with the primary but not with the secondary hydroxyl group, in any case by conversion into such groups as are not essentially attacked by the oxidising agent. Obviously it is also possible to start from hydroxyl derivatives with partly substituted hydroxyl groups and thus to arrive at the corresponding oxo-hydroxy derivatives such as the esters, ethers or the like.

The working up of the reaction products takes place by known physical or chemical methods, for example, by recrystallisation, sublimation, adsorption or reaction with so-called ketone reagents, such as phenyl hydrazine, semi-carbazide, hydroxylamine and the like.

The following examples illustrate the invention:

Example 1

0.32 gram of tetrahydroxy-pregnene, prepared according to the procedure described in the application of W. Logemann, Ser. No. 153,002, are dissolved in 9.3 ccs. of cyclohexanone and heated to 100° C. After addition of 0.9325 gram of aluminum isopropylate the whole is heated for a further 15 minutes to 100° C. during which time a slow stream of nitrogen is passed through the reaction liquid. Finally the cyclohexanone is distilled off in steam and the residue treated with ether. After acidification with dilute sulphuric acid the ether is washed with dilute sodium carbonate solution and water, dried and evaporated. The residue obtained, when tested on a cat having no suprarenal glands, exhibits an increased activity compared with the starting material.

The oxidation can also be carried out with chromic acid but in this case it is to be recommended to protect the ring double bond from the action of the oxidising agent by adding on bromine.

Instead of using chemical oxidation means one may also proceed in the following manner: The solution of $\Delta^{5,6}$-tetrahydroxypregnene-3.17.20.21 in aqueous dioxane is introduced into press juice obtained from beer yeast. Thereupon the mixture is inoculated with *Acetobacter suboxydans* and kept for about 14 days at 25–30° C. The reaction mixture is then extracted with ether. The ethereal solutions are washed with sodium carbonate solution and water and evaporated to dryness in a vacuum. The residue is treated with Girard-reagent and yields after recrystalisation from dilute acetone $\Delta^{4,5}$-pregnendione 3,20-diol-17.21.

Example 2

Tetrahydroxy-pregnene, prepared in accordance with the procedure of the application of W. Logemann, Ser. No. 153,002, is converted in known manner into the 21-mono-tritylether, for example by treatment with a quantity of trityl chloride calculated for etherification of one hydroxyl group. The process is now conducted as described in example 1 whereby after splitting off the ether the 3.20-diketo-17.21-dihydroxypregnene is obtained.

Example 3

0.1 gram of 21-hydroxy-pregnendione, prepared in accordance with the procedure of A. Serini and W. Logemann, U. S. patent application Ser. No. 213,630, filed June 14, 1938, is boiled under reflux in a glycerol bath for 15 hours at 110° C. bath temperature with 0.1 gram of aluminum isopropylate and a mixture of 4 ccs. of benzene and 1 cc. of dry acetone. Then the reaction solution after the addition of ether is extracted with dilute sulphuric acid, the ether solution washed several times with water and after drying evaporated. The oxidation product is obtained as a light oil from which by recrystallisation the 21-aldehydo-pregnendione-3.20 can be isolated.

By an analogous oxidation of the 21-hydroxy-pregnenol-3-one-20 there can likewise be produced the same 21-aldehydo-pregnendione-3.20.

Example 4

500 mgs. of pregnene-triol-(17,20,21)-one-(3), prepared in accordance with the procedure of W. Logemann U. S. patent application Ser. No. 153,002, are dissolved in 10 ccs. of pyridine. To this solution there are added 440 mgs. of triphenylchloromethane (1.1 mol) and heated for one hour in a boiling water bath. Thereupon the pyridine is distilled off in a vacuum, the residue is dissolved in ether. The ethereal solution is washed with sodium bisulfate, sodium bicarbonate, and water. After evaporating the ether the residue is recrystallised from acetone. The product obtained has a melting point of 199–200° C.

The oxidation of this compound is carried out in the same manner as described in Example 3.

In order to oxidise the mono-tritylether one may also proceed in the following manner:

The ether is dissolved in glacial acetic acid, to this solution there is added a solution of chromium trioxide in 95% acetic acid and the mixture is allowed to stand for 12 hours at room temperature. The excess of chromium trioxide is removed by adding methyl alcohol to the solution and thereupon the trityl residue is split off by treating the mixture with a solution of hydrochloric acid in glacial acetic acid. After removing the triphenylmethyl chloride the remaining solution is extracted with ether, the ether solution washed with sodium bicarbonate solution and with water, and evaporated to dryness. From the residue there can be isolated a $\Delta^{4,5}$-pregnenedione-3.20-diol-17.21.

Instead of hydrochloric acid there may also be employed for splitting off the trityl residue hydrobromic acid preferably dissolved in an indifferent organic solvent, or sulfuric acid preferably dissolved in alcohol or dioxane or any other water soluble organic solvent.

Example 5

100 mg. of $\Delta^{4,5}$-pregnendione-(3,20)-ol-21, prepared in accordance with the procedure of A. Serini and W. Logemann U. S. patent application Ser. No. 213,630, filed June 14, 1938, are dissolved in a mixture of 4 ccs. of toluene and cyclohexanone and caused to boil for 15 minutes while introducing dry oxygen-free nitrogen. Thereupon 52 mg. of aluminum-isopropylate are added and the mixture is kept boiling under reflux for four hours. After allowing the mixture to cool in a stream of nitrogen it is diluted to 500 ccs. with freshly distilled ether, thoroughly shaken with 1 n hydrochloric acid, washed with water until neutral reaction and subjected to a steam distillation; the residue is dissolved in ether, the ethereal solution is evaporated to dryness and the residue is dried in a vacuum. Thus, 76 mg. of a substance are obtained which exhibits in the cat test about twice the cortin activity of the starting material.

From the ethereal solution of the substance there may be isolated with dilute sodium carbonate solution further amounts of an acid fraction. Thereupon $\Delta^{4,5}$-pregnendione(3,20)al-21 is isolated whereby of course every precaution has to be taken not to oxidise this aldehyde. It can be purified by recrystallisation, chromatographic analysis, sublimation, and the like.

In the place of cyclohexanone there may be used other ketones as hydrogen acceptors such as benzophenone and the like.

Of course, many other changes and variations may be made in the reaction conditions, in the starting materials used, the solvents employed, the temperature, the duration of reaction, the working up and removing of the by-products and the like, as is known to those skilled in the art. For instance, instead of the above mentioned starting materials the tetra-hydroxy and tri-hydroxy-pregnene compounds may be used which contain oxygen or hydroxy groups in 11 or 12 position such as the $\Delta^{4,5}$-pregnene-3.20-dione-11.17.21-triol, the $\Delta^{4,5}$-pregnene-3.11.20-trione 17.21-diol or the like. All such variations may be made in accordance with the principles set forth herein and in the claims annexed hereto.

What we claim is:

1. Process for the manufacture of cyclopentano-polyhydrophenanthrene compounds, wherein polyhydroxy compounds of the cyclopentanopolyhydrophenanthrene series which contain at the 17-position a side chain carrying two members of the group consisting of OH and =O, at least one member being OH and which are substituted in the ring system by at least one member of the group consisting of the hydroxyl group and oxygen, are subjected to the action of such dehydrogenating agents as are capable of converting primary and secondary alcohol groups into carbonyl groups.

2. Process as claimed in claim 1, in which as starting material saturated pregnane compounds are employed.

3. Process as claimed in claim 1, in which as starting material 3.17.20.21-tetrahydroxy-pregnene is employed.

4. Process as claimed in claim 1, in which as starting material $\Delta^{4,5}$-21-hydroxy-pregnendione-3.20 is employed.

5. Process as claimed in claim 1, in which as oxidising agents metal alcoholates are employed in the presence of oxo compounds.

6. Process as claimed in claim 1, in which the oxidation is carried out by biochemical methods.

7. Process as claimed in claim 1, in which only part of the hydroxyl groups present, in the case of polyhydroxy compounds, is oxidised.

8. Process as claimed in claim 1, in which, in the case of polyhydroxy compounds, certain of the hydroxyl groups prior to the oxidation are converted into such groups as can be again converted into the hydroxyl group.

9. Process as claimed in claim 1, in which the oxidising agent is employed in the quantity calculated for the oxidation of a particular number of hydroxyl groups in the case of polyhydroxy compounds.

10. Process as claimed in claim 1, in which any unsaturated carbon-carbon double bonds are intermediately protected from the attack of the oxidising agent.

11. Process as set forth in claim 1, wherein the starting material is an unsaturated pregnane compound.

12. $\Delta^{4,5}$-pregnendione-3,20-a1-21.

13. Process as set forth in claim 1 in which any unsaturated carbon-carbon double bonds in the starting material are intermediately protected from the attack of the oxidizing agent by bromination of said starting material.

14. Process for the manufacture of oxo-group containing compounds of the cyclopentano polyhydro phenanthrene series comprising subjecting a member of the group consisting of primary and secondary alcohols of such series having at the 17-carbon atom a side chain with more than one oxygen atom, to the action of oxidizing and dehydrogenating agents.

15. Process according to claim 14, wherein the starting material comprises a compound having a side chain with at least two hydroxyl groups, the ring system being substituted by at least one hydroxyl group.

16. Process according to claim 14, wherein the starting material comprises a compound with a side chain having at least one hydroxyl group and one further oxygen atom, while the ring system is substituted by at least one oxygen atom.

WILLY LOGEMANN.
HANS-HERLOFF INHOFFEN.
HANS EYSENBACH.